(12) United States Patent
Rager et al.

(10) Patent No.: US 7,920,869 B2
(45) Date of Patent: Apr. 5, 2011

(54) HOME NETWORK SEARCHING WHEN ROAMING IN WIRELESS COMMUNICATIONS NETWORKS

(75) Inventors: Kent D. Rager, Grayslake, IL (US); Marcia J. Otting, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 313 days.

(21) Appl. No.: 10/717,255

(22) Filed: Nov. 19, 2003

(65) Prior Publication Data

US 2005/0107083 A1 May 19, 2005

(51) Int. Cl.
*H04W 36/00* (2009.01)
*H04W 40/00* (2009.01)
(52) U.S. Cl. ............................... 455/437; 455/445
(58) Field of Classification Search ............... 455/435.1, 455/445, 437
See application file for complete search history.

(56) References Cited

U.S. PATENT DOCUMENTS

| 5,839,069 | A | * | 11/1998 | Keshavachar et al. | ......... 455/437 |
| 5,950,130 | A | | 9/1999 | Coursey | |
| 6,085,087 | A | | 7/2000 | Hori et al. | |
| 2002/0068574 | A1 | * | 6/2002 | Vestergaard et al. | ......... 455/445 |
| 2002/0119774 | A1 | | 8/2002 | Johannesson et al. | |
| 2003/0003910 | A1 | | 1/2003 | McClure | |

FOREIGN PATENT DOCUMENTS

| GB | 2352135 A | 1/2001 |
| GB | 2352135 A1 | 1/2001 |
| JP | 1997065415 A | 7/1997 |
| JP | 2000004481 A | 1/2000 |
| JP | 2001274816 A | 10/2001 |
| WO | 0163842 A1 | 8/2001 |
| WO | 02093955 A1 | 11/2002 |
| WO | 2004019638 A | 3/2004 |
| WO | 2004019638 A2 | 3/2004 |
| WO | 2004019638 A3 | 3/2004 |
| WO | 2004019638 A3 | 4/2004 |

OTHER PUBLICATIONS

3GPP; ETSI TS 123 122 V3.10.0 (Sep. 2003); 38 pages.
3GPP; ETSI TS 131 102 V4.10.0 (Sep. 2003); 144 pages.
"Universal Mobile Telecommunications System (UMTS); Non-Access-Stratum functions related to Mobile Station (MS) in idle mode (3GPP TS 23.122 version 3.10.0 Release 1999); ETSI TS 123 122" ETSI Standards, European Telecommunications Standards Institute, Sophia-Antipo, FR, vol. 3-CNI, No. V3100, Sep. 2003, XP014016470 ISSN: 0000-0001.
"Universal Mobile Telecommunications System (UMTS); Characteristics of the USIM application (3GPP TS 31.102 version 4.10.0 Release 4); ETSI TS 131 102" ETSI Standards, European Telecommunications Standards Institute, Sophia-Antipo, FR, vol. 3-T3, No. V4100, Sep. 2003, XP014017408 ISSN: 0000-0001.

(Continued)

*Primary Examiner* — William D Cumming
(74) *Attorney, Agent, or Firm* — Roland K. Bowler, II

(57) ABSTRACT

A method in a wireless communications device including determining whether the device is operating in a network other than a home network, determining whether to search for the home network when not operating in the home network by comparing network record information associated with the network in which the device is operating to reference information. In some embodiments, the device indicates that it is operating in a network other than the network in which it is operating.

11 Claims, 4 Drawing Sheets

OTHER PUBLICATIONS

"Universial Mobile Telecommunications System (UMTS); Non Access-Stratum functions related to Mobile Station (MS) in idle mode (3GPP TS 23.122 version 3.10.0 Release 1999); ETSI TS 123 122" ETSI Standards, European Telecommunications Standards Institute, Sophia-Antipo, FR, vol. 3-CNI, No. V3100, Sep. 2003, XP014016470 ISSN: 0000-0001.

"Universial Mobile Telecommunications Systems (UMTS); Characteristics of the USIM application (3GPP TS 31.102 version 4.10.0 Release 4); ETSI TS 131 102" ETSI Standards, European Telecommunications Standards Institute, Sophia-Antipo, FR, vol. 3-T3, No. V4100, Sep. 2003, XP014017408, ISSN: 0000-0001.

EP04800782; European Office Action, Sep. 18, 2009.

* cited by examiner

| | OPL INFORMATION | | | |
|---|---|---|---|---|
| RECORD # | PLMN-ID | LAC RANGE | PNN RECORD # | SEARCH INFORMATION |
| 1 | 318-261 | 0002-0003 | 1 | FALSE |
| 2 | 318-261 | 0001-0001 | 2 | FALSE |
| 3 | 318-411 | 0000-FFFF | 1 | TRUE |
| ... | ... | ... | ... | ... |

| PNN INFORMATION | | |
|---|---|---|
| RECORD # | NETWORK NAME | SEARCH INFORMATION |
| 1 | A | FALSE |
| 2 | B | FALSE |
| 3 | C | TRUE |
| ... | ... | ... |

HOME NETWORK SEARCHING WHEN ROAMING IN WIRELESS COMMUNICATIONS NETWORKS

FIELD OF THE DISCLOSURE

The present disclosure relates generally to wireless communications and, more particularly, to determining whether a wireless communications device, for example, a mobile cellular telephone, should search for its home network when operating in other networks, for example, when roaming in a virtual Home Public Land Mobile Network (H-PLMN), and methods therefor.

BACKGROUND

It is common for wireless communications network operators to offer service plans, for example, nationwide calling plans, with coverage in geographical areas that are served by third party network operators but not by the operator offering the service plan. To do this, network operators enter into network sharing agreements with other network operators so that operators may provide service to subscribers in areas where the operators do not actually own and operate network infrastructure.

In some mobile stations, the display indicates that the mobile station is operating in a home network when the mobile station is actually in a third party operator network, thus making it appear to the user as though the mobile station is camped on its home network when in fact the mobile station is roaming, i.e., operating in a third party network. For example, the Global System for Mobile Communications (GSM) specification defines a feature called Extended Operator Name String (EONS) enabling a GSM Subscriber Identification Module (SIM) card issuer, for example, a network operator, to control the displayed idle-mode operator name using a set of rules and associated name strings stored on the SIM card. The rules are known as the Operator PLMN List (OPL) and the associated name string is known as the PLMN Network Name (PNN) list. The EONS feature makes it possible for the phone to display a particular name other than that of the actual network where the mobile station operating. Some GSM network operators use the EONS feature to provide "virtual" nationwide coverage by programming the SIM to make the mobile station display the operator's name in all or in particular portions of third party networks. Under these circumstances, the mobile station is said to be in a "virtual" home network.

Wireless communications devices, or mobile stations, operating in third party networks are actually roaming outside the home operator's network, regardless of what may be indicated to the user by the mobile station. A roaming mobile station periodically scans for its home network, for example, its Home PLMN (H-PLMN). The network scanning procedure however consumes power, which significantly reduces battery life compared to the power consumed when the mobile station is not roaming and scanning for its home network.

Release 99 of the $3^{rd}$ Generation Partnership Project (3GPP) GSM specifications allows networks to specify a list of equivalent PLMNs that are treated by recipient mobile stations as though they were the same network. Under Release 99, a mobile station will not perform periodic H-PLMN searches when camped on networks that are equivalent to the mobile station's H-PLMN. However, the Release 99 specification is a significant change that will require some time to implement fully, rendering the equivalent PLMN feature substantially unavailable for near term use. Moreover, the equivalent PLMN feature is available only in Release 99 specification compliant networks that elect to utilize the equivalent PLMN data field in messages responding to location area updates from the mobile station. Particularly, the Release 99 equivalents PLMN feature is dependent upon competing network operators configuring network information in a manner that reduces unnecessary H-PLMN searching by roaming mobile stations. If there is no indication that the roaming PLMN is equivalent to the mobile station's home PLMN, the roaming mobile station will continue searching for its H-PLMN.

The various aspects, features and advantages of the disclosure will become more fully apparent to those having ordinary skill in the art upon careful consideration of the following Detailed Description thereof with the accompanying drawings described below.

DETAILED DESCRIPTION

Figures 1, 2, 3:
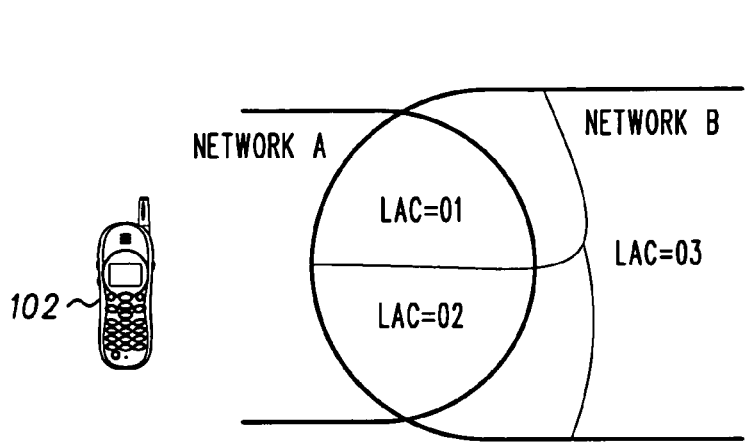
FIG. 1 illustrates exemplary wireless communications networks, which may be operated by different service providers.
FIG. 2 illustrates an exemplary portion of operator network list information.
FIG. 3 illustrates exemplary operator network name list information.

FIG. 1 illustrates a geographical region 100 including a first communications network "A" and a second communications network "B" operated by different operators that provide wireless communications services to mobile communications devices, for example, mobile station 102 in FIG. 1. The exemplary networks "A" and "B" include overlapping portions, though generally the networks need not overlap. Some networks include one or more location areas, which are typically defined by the corresponding network operators. The exemplary network "B" includes location area codes: LAC 01, LAC 02 & LAC 03. A wireless communications device reports changes in it current location area to the network.

The exemplary wireless communications networks generally include communications subsystems comprising a controller communicably coupled to one or more transceiver stations that provide service coverage for corresponding areas, for example, cellular areas. In some network architectures, one or more communications subsystems serve corresponding location areas in networks that include multiple location areas. The communications networks may provide circuit and/or data services. Exemplary cellular communications networks include $2^{nd}$ Generation (2G) Global System for Mobile Communications (GSM) radio access networks, 2.5 Generation GSM and CDMA networks, and $3^{rd}$ Generation (3G) Universal Mobile Telephone System (UMTS) W-CDMA networks, other communications networks, and combinations of these networks. The infrastructure architecture of these and other networks are known generally and not discussed further herein.

The wireless communications device is, for example, a mobile cellular communications handset that operates pursuant to one or more applicable communications protocols corresponding to the communications networks in which it operates, for example, TDMA, GSM, CDMA, UMTS W-CDMA, among other protocols. More generally, the wireless communications device may be a personal digital assistant, or a wireless enabled laptop or notebook computer, or some other wireless communications device that operates in different networks, for example, in networks "A" and "B" in FIG. 1.

The wireless communications device 102 is usually associated with a corresponding home network referred to as an H-PLMN in some communications standards, for example, network "A" in FIG. 1. Generally, wireless communications devices may also operate in networks other than the home network, for example, through contractual agreements made by the home network operator with other operators, thereby providing substantially seamless communications services to roaming wireless communications devices. And some wireless communications devices, for example, some GSM mobile stations, are programmed to indicate that the mobile station is operating in a home network when it is roaming.

In some embodiments, the wireless communications device includes a subscriber information module including subscriber identity and other information on a removable integrated circuit (IC) card. Exemplary identification modules, also referred to generally as "smart cards", include the GSM Subscriber Identification Module (SIM), SIM for UMTS, also known as a User Services Identity Module or a Universal Subscription Identity Module (U-SIM), or equivalent modules used in CDMA 1x compliant devices and other communications devices.

Some subscriber information modules include, among other information, wireless communications device identification information, for example, an International Mobile Subscriber Identity (IMSI), which is used by communications networks to identify subscriber devices. Subscriber information modules may also include preferred service provider information for use by the mobile station when operating in networks other than the home network, i.e., when roaming.

In one embodiment, the wireless communications device includes, stored thereon, extended operator name string information. This information may be stored, for example, on a SIM card or on some other smart card of the wireless communications device. FIG. 2 illustrates a modified GSM Extended Operator Name String (EONS) comprising Operator PLMN List (OPL) information and FIG. 3 illustrates modified PLMN Network Name (PNN) information. In GSM devices, the EONS information is stored in a SIM card. In other embodiments, similar or equivalent information may be stored on some other smart card or medium.

The OPL specifies rules for what network name to display on the wireless communications device. FIG. 2 illustrates an exemplary OPL information file 200, in tabular form for ease of illustration. Each of the exemplary OPL information file records, identified in FIG. 2 by corresponding record numbers 210, includes network identification information, for example, a PLMN-ID, 220, location area information, for example, a range of location areas 230, and a reference to corresponding PNN record information 240. In one embodiment, the ordering of the records in the OPL information file 200 implies a record number in the absence of explicit record number data. FIG. 3 illustrates an exemplary PNN information file 300, also in tabular form for ease of illustration, including multiple records, identified in FIG. 3 by a corresponding record number 310, having corresponding network name information 320. In one embodiment, the ordering of the records in the PNN information file 300 implies a record number in the absence of explicit record number data.

The PNN record information 240 of the OPL information table 200 is used to reference corresponding name information 320 in the PNN information table 300. The identity of the network in which the wireless communications device is operating is generally obtained from the network. In practice, the wireless communications device uses the network identity and any location area information to locate the corresponding record in the OPL file, which is used to cross-reference the corresponding PNN record. Using the EONS information of FIGS. 2 and 3, for example, a wireless communications device operating in LAC 0002-0003 of PLMN-ID 318261 would display network name "A", rather than some other network name that may be affiliated with PLMN-ID 318261. When the device is operating in LAC 0001 of PLMN-ID 318261, it would display network name "B".

In FIG. 1, when the wireless communications device 102, is roaming in location area code (LAC) 03 of network "B", the wireless communications device will not find its home network "A", since it is unavailable. Under these circumstances, it is unnecessary in at least some applications for the wireless communications device to search for its home network, which is unavailable. At least one reason for not searching for the home network is to conserve resources, for example, battery power.

According to one aspect of the disclosure, in some applications, a mobile wireless communications device operating in a network other than the home network of the wireless communications device determines whether to search for its home network when roaming by comparing network record information corresponding to the network in which the wireless communications device is operating to reference information, examples of which are discussed further below.

Figure 4:
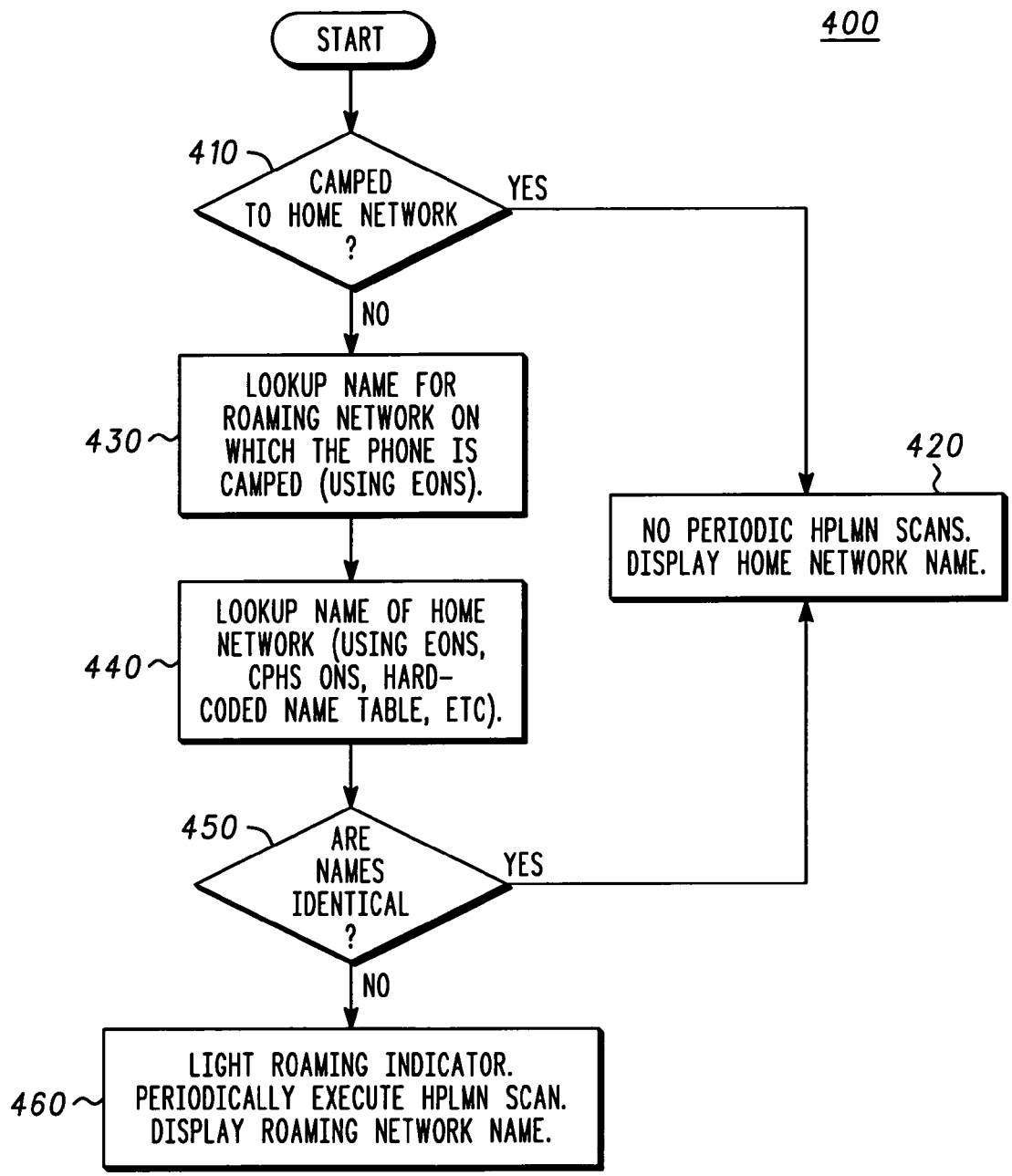
FIG. 4 is a first process flow diagram for determining whether to search for a home network.

In a first particular exemplary embodiment, illustrated in the process diagram 400 of FIG. 4, at block 410, the wireless communications device determines whether it is operating in, or camped on, its home network, for example, its Home Public Land Mobile Network (H-PLMN) or in some other network. In FIG. 4, at block 420, when the wireless communications device is operating in its home network, the wireless communications device does not scan for the home network. In embodiments where the wireless communications device includes a roaming indicator, the roaming indicator is also disabled when the device is operating in its home network.

In one embodiment, a mobile wireless communications device operating in a network other than the home network of the wireless communications device determines whether to search for its home network by comparing network name information associated with the network in which the wireless communications device is operating to reference information. The network name information is a network name other than the name of the network in which the device is operating, for example, the home network name to be displayed on the wireless communications device when roaming.

In FIG. 4, at block 430, the wireless communications device determines network name information. In FIG. 3, for example, the wireless communications device obtains a PLMN Network Name (PNN), e.g., "A", "B", "C", etc., from the PNN information 300 using the PNN record information 240 from the OPL information 200 of FIG. 2. In FIG. 4, at block 440, the wireless communications device determines the name of the reference network, for example, using the EONS information, CPHS ONS, alternative name table information, or some other information etc. In one embodiment, the reference network name is the home network name. At block 450, the name obtained at block 430 is compared to the reference name obtained at block 440. If the names are identical, or match, the wireless communications device does not scan for its home network while roaming, as indicated at block 420. Under these circumstances any roaming indicator would also be disabled.

Thus in at least some variations of the exemplary process of FIG. 4, the wireless communications device uses prior art EONS information to determine whether it should scan for its home network when roaming. If the network name to be displayed using EONS matches the home operator name string as defined, for example, by the CPHS ONS file, then the wireless communications device does not search for its H-PLMN. Since the home network operators provision the SIM for EONS, the operator knows where the mobile should and should not search for its home network.

In an alternative embodiment, the network name information is compared to reference network name information obtained from the EONS file. Particularly, the network name information is obtained from the PNN information file 300 of FIG. 3 using the OPL information file 200 in FIG. 2, as discussed above in connection with block 430 in FIG. 4. According to this alternative embodiment, in some cases, the reference network name may be obtained from the OPL information file 200 of FIG. 2 as follows: The wireless communications device uses its home network identification, for example, its H-PLMN identity, to identify a corresponding record in the OPL information table 200 of FIG. 2. In one embodiment, the H-PLMN ID is obtained from the International Mobile Subscriber Identity (IMSI), known formerly as the International Mobile Station Identity. The reference network name is obtained by referencing a network name 320 from the PNN information file 300 of FIG. 3 using the PNN record information 240 associated with the IMSI. In some instances, however, the H-PLMN ID may have multiple records in the OPL information file 200, with references to corresponding network names in the PNN information file, resulting in an ambiguous reference to the network name in the PNN information file.

In another alternative embodiment, the network name information is compared to reference network name information obtained from a PLMN text table on the wireless communications device. PLMN text tables are known generally and used in the prior art for correlating PLMN identification information with network name information to display when in a corresponding PLMN. According to this alternative embodiment, the wireless communications device uses its home network identification, for example, its H-PLMN identity, to identify a corresponding record in the PLMN text table. And the network name or PLMN text table record number is used as the reference information.

In FIG. 4, in some embodiments, at block 420, the wireless communications device indicates, for example, on an LCD display, that it is operating in its home network, when in reality the device is roaming. In one embodiment, the network name displayed is the network name obtained from the PNN table 300 using the OPL table 200. Thus in at least some variations of the process of FIG. 4, the same information used to display virtual home network information when the wireless communications device is roaming is also used to determine whether to search for the home network when roaming. In some embodiments, this same information is also used to determine the states of the roaming indicator.

In FIG. 4, at block 460, if there is not a match between the names obtained at blocks 430 and 440, the wireless communications device scans for its home network. At block 460, the device may also indicate that it is roaming and display the name of the roaming network.

Figure 5:
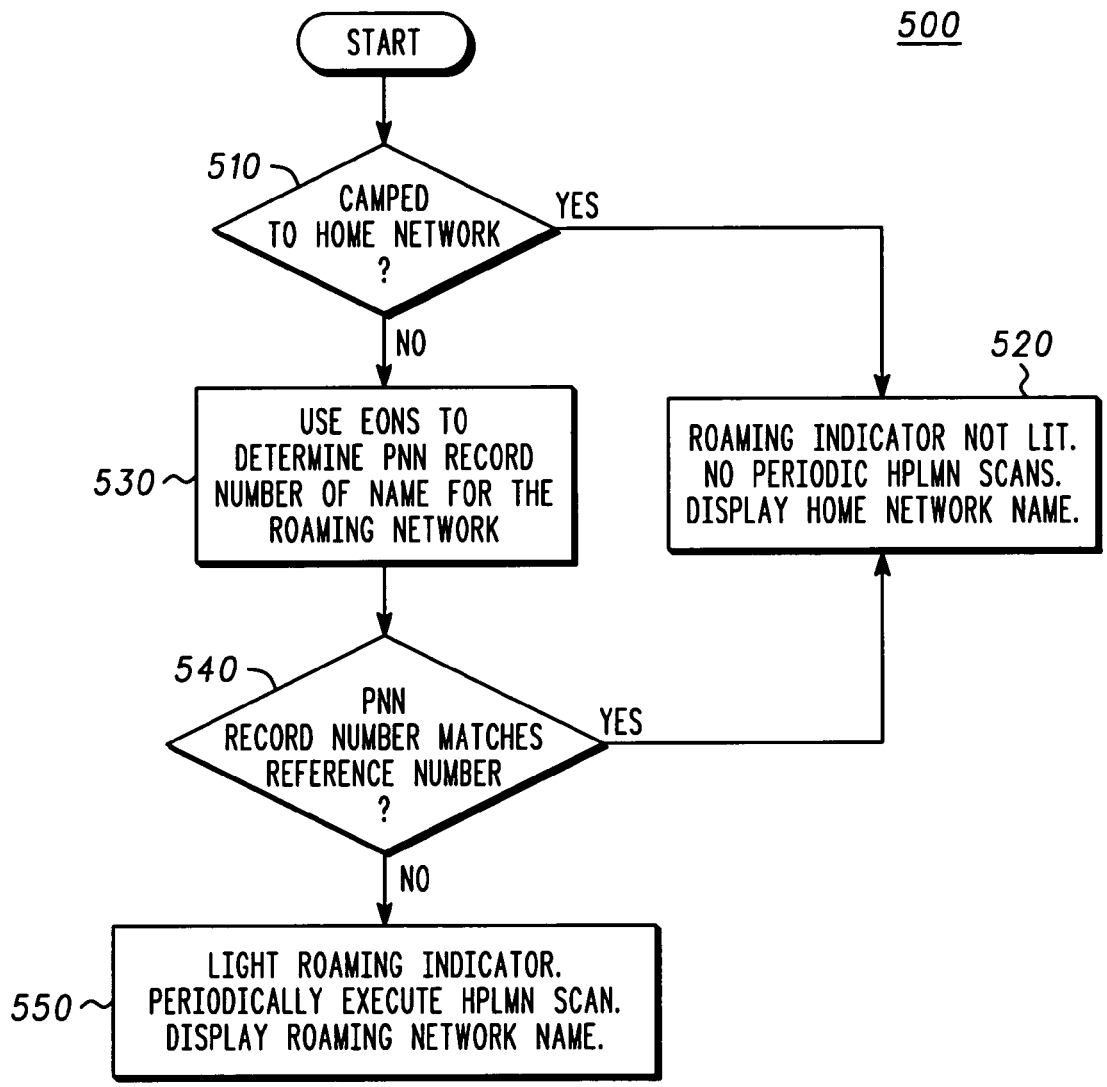
FIG. 5 is a second process flow diagram for determining whether to search for a home network.

In an alternative embodiment, illustrated in the process diagram 500 of FIG. 5, at block 510, the wireless communications device determines whether it is operating in, or camped on, its home network, for example, its Home Public Land Mobile Network (H-PLMN), or in some other network. At block 520, when the wireless communications device is operating in its home network, the wireless communications device does not scan for the home network. Any roaming indicator on the wireless communications device is also disabled.

In the alternative embodiment, the mobile wireless communications device operating in the network other than its home network determines whether to search for its home network when roaming by comparing network record information associated with the network in which the device is operating to reference information. In one embodiment, the network record information is a network record number for a network other than the network in which the device is operating, for example, a record number corresponding to virtual home network information to be displayed on the wireless communications device when roaming.

In the exemplary process of FIG. 5, at block 530, the wireless communications device determines network record number information. In FIG. 2, for example, the wireless communications device obtains a PLMN Network Name (PNN) record number, e.g., "1", "2", "3", etc., from the PNN record information 240 of the OPL file. In FIG. 5, at block 540, the wireless communications device determines whether the record number matches a reference number by comparing the record number with the reference number. In one embodiment, the reference number is a record number corresponding to the home network name. The reference number may be stored on the wireless communication device, e.g., in non-volatile memory during manufacture, or it may be stored on a smart card, e.g., on a SIM, or USIM, etc. More generally, multiple reference numbers are stored on the wireless communications device or on a smart card thereof. If the network record number matches any one of the multiple reference numbers, the wireless communications device does not scan for its home network (or indicate that it is roaming), as indicated at block 520.

Thus in at least some variations of the exemplary process of FIG. 5, the wireless communications device uses prior art EONS information to determine whether it should scan for its home network when roaming. If the EONS network record number corresponding to the roaming network matches at least one reference number, then the wireless communications device does not search for its H-PLMN, and any roaming indicator is disabled.

In FIG. 5, in some embodiments, at block 520, the wireless communications device indicates that it is operating in its home network, when in reality the device is roaming. In one embodiment, the network name displayed is the network name obtained from EONS information. Thus in at least some variations of the process of FIG. 5, the record number of the OPL and/or PNN information used to display virtual home network information when the wireless communications device is roaming is also used to determine whether to search for the home network when roaming and to control the state of any roaming indicator. In FIG. 5, at block 550, if there is not a match between the record-number obtained at block 530 and the reference number, the wireless communications device scans for its home network.

Figure 6:
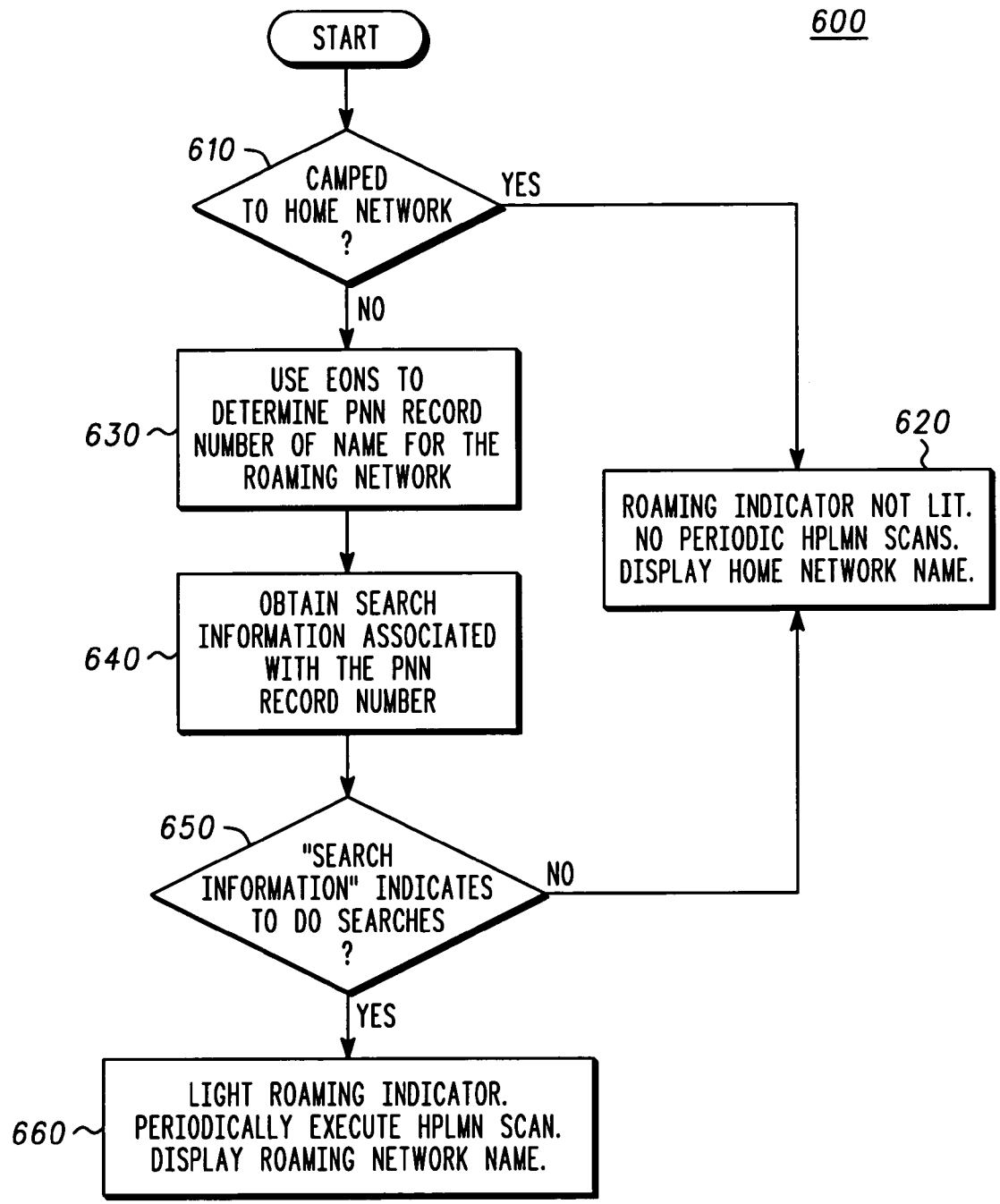
FIG. 6 is a third process flow diagram for determining whether to search for a home network.

In another alternative embodiment, illustrated in the process diagram 600 of FIG. 6, at block 610, the wireless communications device determines whether it is operating in, or camped on, its home network, for example, its Home Public Land Mobile Network (H-PLMN), or in some other network. At block 620, when the wireless communications device is operating in its home network, the wireless communications device does not scan for the home network.

In the alternative embodiment of FIG. 6, the mobile wireless communications device operating in a network other than its home network determines whether to search for its home network when roaming based on search information, for example, a binary flag, associated with network record information associated with the network in which the device is operating. The search information may be stored on a smart card, for example, with EONS information on a SIM or USIM card of the wireless communications device, as discussed further below.

In FIG. 6, at block 630, the wireless communications device determines network record information for the network in which the wireless communication device is operating. In one embodiment, a record in the OPL information file 200 of FIG. 2 is identified corresponding to the network in which the device is operating as discussed above. In another embodiment, a record in the PNN information file 300 of FIG. 3 is identified using the PNN record information 240 in the OPL file. At block 640, the wireless communications device obtains search information from a smart card, for example, a SIM, USIM, etc. on the wireless communications device.

In one embodiment, the search information is part of the modified OPL information file 200 illustrated in FIG. 2. In this embodiment, a new OPL reference record data field 250 is utilized. The reference record data field accommodates search information, for example, a binary bit which is set or not set, indicating whether to search for the home network. In an alternative embodiment, the search information is in a new PNN record data field 340 that is part of the PNN information file 300 of FIG. 3. In another embodiment, the search information is in a discrete file having multiple records that correspond, for example, by virtue of an explicit or implied record number, to records in the OPL and/or PNN information files.

In FIG. 6, at block 650, the wireless communications device interprets and acts upon the search information obtained at block 640. In the exemplary embodiment where the search information is a binary flag, the device either searches for the home network or does not search for the home network depending on the state of the flag. If the flag indicates that home network searching is not required, the algorithm proceeds to block 620. In some embodiments, at block 620, the wireless communications device may also indicate that it is in its home network when it is roaming. If the flag indicates that home network searching is required, the algorithm proceeds to block 660. At block 660, the wireless communications device resumes scanning for its home network and in some embodiments may indicate that it is roaming.

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the disclosure, which is to be limited not by the exemplary embodiments but by the appended claims.

What is claimed is:

1. A method in a wireless communications device, the method comprising:

operating in a network other than a home network of the wireless communications device;

determining whether to search for the home network of the wireless communications device when not operating in the home network by comparing network record information associated with the network in which the mobile wireless communications device is operating to reference information includes comparing a network record name to a reference name.

2. The method of claim 1, identifying the network record information associated with the network in which the wireless communications device is operating using location area information associated with the network in which the wireless communications device is operating, indicating at the wireless communications device in which network the wireless communications device is operating using the network record information associated with the network in which the wireless communications device is operating.

3. The method of claim 1, comparing the network record name to the reference name includes comparing an extended operator name string network name to the reference name.

4. The method of claim 1, comparing the network record name to the reference name includes comparing a network name used to indicate which network the wireless communications device is operating to the reference name.

5. The method of claim 1, comparing the network record name to a reference name includes comparing the network record name to common personal communications network handset specification operator name string information.

6. A method in a mobile wireless communications device, the method comprising:

operating in a network other than a home network of the wireless communications device;

determining whether to search for the home network when operating in the network other than the home network based on information used to indicate that the wireless communications device is operating in a network other than the network in which the wireless communications device is operating, wherein determining whether to search for the home network when operating in a network other than the home network includes comparing network number information to reference number information.

7. The method of claim 6, determining whether to indicate that the wireless communications device is roaming based on information used to indicate that the wireless communications device is operating in a network other than the network in which the wireless communications device is operating.

8. A method in a mobile wireless communications device, the method comprising:

identifying a network in which the wireless communications device is operating;

determining operator name string information corresponding to the network in which the wireless communications device is operating;

determining whether to search for a home network when roaming based on search information associated with the operator name string information.

9. The method of claim 8, indicating, at the wireless communications device, network information when roaming based on the operator name string information with which the search information is associated.

10. The method of claim 8,
determining network record information includes determining extended operator name string information corresponding to the network in which the wireless communications device is operating,
determining whether to search for the home network when roaming based on search information associated with the extended operator name string information.

11. The method of claim 8, determining whether to provide a roaming indicator on the wireless communications device when roaming based on the search information associated with the operator name string information.

* * * * *